(12) United States Patent
Marcial-Simon

(10) Patent No.: US 10,800,405 B2
(45) Date of Patent: Oct. 13, 2020

(54) SYSTEM FOR PARKING A VEHICLE

(71) Applicant: Bayerische Motoren Werke Aktiengesellschaft, Munich (DE)

(72) Inventor: Enrique Marcial-Simon, Veitshoechheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 40 days.

(21) Appl. No.: 15/989,349

(22) Filed: May 25, 2018

(65) Prior Publication Data

US 2018/0273029 A1 Sep. 27, 2018

Related U.S. Application Data

(63) Continuation of application No. PCT/EP2016/070576, filed on Sep. 1, 2016.

(30) Foreign Application Priority Data

Nov. 26, 2015 (DE) .......................... 10 2015 223 471

(51) Int. Cl.
*B60W 30/06* (2006.01)
*B62D 15/02* (2006.01)
(Continued)

(52) U.S. Cl.
CPC ............ *B60W 30/06* (2013.01); *B60W 10/04* (2013.01); *B60W 10/18* (2013.01); *B60W 10/20* (2013.01);
(Continued)

(58) Field of Classification Search
CPC ...... B60W 30/06; B60W 10/04; B60W 10/18; B60W 10/20; B60W 2550/40;
(Continued)

(56) References Cited

U.S. PATENT DOCUMENTS

| 6,594,600 B1 | 7/2003 | Arnoul et al. |
| 2007/0198190 A1 | 8/2007 | Bauer et al. |

(Continued)

FOREIGN PATENT DOCUMENTS

| CN | 102442311 A | 5/2012 |
| CN | 103857583 A | 6/2014 |

(Continued)

OTHER PUBLICATIONS

Chinese-language Office Action issued in counterpart Chinese Application No. 201680057339.2 dated Sep. 19, 2019 with English translation (23 pages).

(Continued)

*Primary Examiner* — Aaron L Troost
(74) *Attorney, Agent, or Firm* — Crowell & Moring LLP

(57) ABSTRACT

A system for parking a vehicle includes a mobile terminal. The mobile terminal includes at least one first image acquisition device for acquiring first image data, a first computing unit which is designed to receive the first image data from the first image acquisition device and to generate information indicating a parking position on the basis of the first image data, and a transmission device for transmitting the information. The vehicle includes a receiving device which is designed to receive the information, and a second computing unit which is designed to determine a parking strategy on the basis of the information. The vehicle includes a parking apparatus which is designed to park the vehicle in the parking position taking into account the parking strategy.

15 Claims, 5 Drawing Sheets

(51) Int. Cl.
  *G01C 11/04* (2006.01)
  *G01C 21/36* (2006.01)
  *B60W 10/04* (2006.01)
  *B60W 10/18* (2012.01)
  *B60W 10/20* (2006.01)
  *G05D 1/00* (2006.01)
  *G05D 1/02* (2020.01)

(52) U.S. Cl.
  CPC ......... *B62D 15/027* (2013.01); *B62D 15/028* (2013.01); *B62D 15/0285* (2013.01); *G01C 11/04* (2013.01); *G01C 21/3602* (2013.01); *G05D 1/0033* (2013.01); *G05D 1/0246* (2013.01); *G05D 1/0276* (2013.01); *B60W 2556/45* (2020.02); *B60W 2710/09* (2013.01); *B60W 2710/18* (2013.01); *B60W 2710/20* (2013.01); *B60W 2720/106* (2013.01); *G05D 2201/0213* (2013.01)

(58) Field of Classification Search
  CPC ......... B60W 2710/09; B60W 2710/18; B60W 2710/20; B60W 2720/106; B62D 15/027; B62D 15/028; B62D 15/0285; G01C 11/04; G01C 21/3602; G05D 1/0033; G05D 1/0246; G05D 1/0276; G05D 2201/0213
  See application file for complete search history.

(56) References Cited

U.S. PATENT DOCUMENTS

| | | |
|---|---|---|
| 2009/0315992 A1 | 12/2009 | Haug |
| 2010/0156672 A1 | 6/2010 | Yoo et al. |
| 2012/0087546 A1 | 4/2012 | Focke et al. |
| 2014/0058613 A1 | 2/2014 | Leinfelder |
| 2014/0222252 A1 | 8/2014 | Matters et al. |
| 2016/0227181 A1* | 8/2016 | Ilic .................. G06K 9/18 |
| 2016/0358474 A1* | 12/2016 | Uppal ............. G06K 9/00812 |
| 2017/0008563 A1 | 1/2017 | Popken et al. |

FOREIGN PATENT DOCUMENTS

| | | | |
|---|---|---|---|
| DE | 10 2006 007 343 A1 | 8/2007 | |
| DE | 10 2007 032 720 A1 | 1/2009 | |
| DE | 10 2009 040 372 A1 | 3/2011 | |
| DE | 10 2009 041 587 A1 | 3/2011 | |
| DE | 10 2012 007 984 A1 | 3/2013 | |
| DE | 10 2014 000 978 A1 | 7/2015 | |
| DE | 10 2014 200 611 A1 | 7/2015 | |
| DE | 102014200611 A1 * | 7/2015 | .......... B62D 15/027 |
| EP | 2 700 567 A2 | 2/2014 | |
| JP | 2001-506369 A | 5/2001 | |
| JP | 2008-174192 A | 7/2008 | |
| WO | WO 2011/150946 A1 | 12/2011 | |

OTHER PUBLICATIONS

German Search Report issued in counterpart German Application No. 10 2015 223 471.1 dated Nov. 14, 2016 with partial English-language translation (Fifteen (15) pages).

International Search Report (PCT/ISA/210) issued in PCT Application No. PCT/EP2016/070576 dated Nov. 21, 2016 with English-language translation (Seven (7) pages).

German-language Written Opinion (PCT/ISA/237) issued in PCT Application No. PCT/EP2016/070576 dated Nov. 21, 2016 (Six (6) pages).

* cited by examiner

SYSTEM FOR PARKING A VEHICLE

CROSS REFERENCE TO RELATED APPLICATIONS

This application is a continuation of PCT International Application No. PCT/EP2016/070576, filed Sep. 1, 2016, which claims priority under 35 U.S.C. § 119 from German Patent Application No. 10 2015 223 471.1, filed Nov. 26, 2015, the entire disclosures of which are herein expressly incorporated by reference.

BACKGROUND AND SUMMARY OF THE INVENTION

The invention relates to a system for parking a vehicle, in particular a motor vehicle, using a mobile terminal.

Maneuvering a vehicle often results in minor or more major damage to a vehicle. In particular the parking process, on account of its complexity, recurrently results in damage to the bodywork of a parking vehicle and/or of adjoining obstacles. This may firstly be because the driver cannot pick up the surroundings of the vehicle completely on account of restricted visibility or because of carelessness by the driver, i.e., failing to notice these obstacles. It is therefore necessary to relieve the driver burden during parking, and to ensure that all available surroundings information is used in the parking process.

To unburden the driver during parking, it is known that vehicles are capable of parking in parking spaces and maneuvering out of them autonomously. This normally presupposes that the driver of the vehicle is sitting in the vehicle and drives to a particular parking space. Once the vehicle has discerned the parking space, this is signaled to the driver and the driver can initiate the parking process. If the vehicle cannot identify the parking space as a parking space, for example if the view is impaired by an obstacle, such as a pillar or a wall, then the driver needs to maneuver the vehicle into a position in which the parking space is discerned. Furthermore, during parking carried out autonomously, it can happen that further obstacles do not become visible until in a late phase of parking, which means that the vehicle needs to adapt its parking strategy, that is to say normally has to carry out a large number of steering and forward and backward movements. This can result in a much longer parking time and, in the worst case, the parking process cannot be continued.

It is therefore an object of the present invention to provide a system for parking a vehicle that allows improved (autonomous) parking of a vehicle, preferably a motor vehicle. Moreover, the system is intended to be configured such that a man-machine interface is improved.

This and other objects are achieved by a system and method for parking a vehicle, as well as a computer-readable storage medium for carrying out the method, in accordance with embodiments of the invention.

In particular, the object is achieved by a system for parking a vehicle, in particular a motor vehicle. The system comprises a mobile terminal, in particular a smart device, such as a smartphone, a smartglass or a smartwatch. The mobile terminal in turn comprises at least one first image capture device for capturing first image data, a first computation unit that is configured to receive the first image data from the first image capture device and to take the first image data as a basis for generating information indicating a parking position, and a transmission device for transmitting the information. The vehicle further comprises a reception device that is configured to receive the information, and a second computation unit that is configured to take the information as a basis for determining a parking strategy, wherein the vehicle comprises a parking apparatus that is configured to take the parking strategy into consideration to park the vehicle at the parking position.

A particular advantage of the system described is that a mobile terminal, independently of the vehicle, captures image data that are used to generate information indicating a parking position. This information is provided to the vehicle after a transmission as appropriate. On the basis of this information, the vehicle can determine a parking strategy that is used to park the vehicle at a parking position. The vehicle is thus not solely reliant on its own sensor system installed in the vehicle. In situations in which the vehicle cannot "see" a parking space, i.e. pick it up by means of lidar scanners, RGB cameras, radar systems or similar sensors, completely from its current position, the system according to the invention nevertheless allows safe parking. Moreover, the system allows pickup of a parking space that has already been performed on the vehicle to be confirmed. Therefore, damage to the vehicle that can be attributed to a parking space being picked up inadequately can be prevented.

Further, the system according to the invention allows a parking strategy determined by the vehicle to be improved, since further information is provided that cannot be ascertained by the vehicle alone on account of the different positions of the vehicle and the mobile terminal.

The information indicating a parking position can include, in one embodiment, a direction and a distance of the parking position relative to the mobile terminal.

The information may thus be in a vectorial depiction, with the spatial dimensions forming the dimensions of the vector. If the information includes the direction and the distance of the parking position relative to the mobile terminal, it is possible for the vehicle to determine the position of the mobile terminal if the vehicle itself is capable of determining the parking position. Moreover, it is also possible, according to the invention, for the vehicle, based on the information, to drive to a position from which it can discern the parking position described by the information better using the installed sensor system. Further, the parking position can be picked up more accurately using the direction and distance of the parking position relative to the mobile terminal.

Furthermore, the first computation unit may be configured to determine the relative position and/or alignment of the vehicle in relation to the mobile terminal on the basis of the first image data.

The mobile terminal may be configured to discern the vehicle in the first image data. Since the vehicle geometry is known, the size ratios in the first image data can be used to ascertain the distance of the mobile terminal relative to the vehicle very accurately. Furthermore, it is also possible for the known vehicle geometry to be used to determine the alignment of the vehicle in the first image data. Therefore, the relative position of the mobile terminal in relation to the vehicle can be determined. Further, it is then possible for the relative position of the vehicle in relation to the mobile terminal to be transmitted to the vehicle if the relative position of the vehicle is part of the information indicating a parking position. This is advantageous because the proportions of the vehicle in the first image data are normally very large. Therefore, edges of the vehicle can easily be discerned. Further, vehicles usually have a single color or at least few colors and can therefore easily be distinguished from the background.

In a further embodiment, the mobile terminal can have an acceleration sensor that is configured to detect a movement of the mobile terminal and to perform the generation of the information indicating a parking position on the basis of the movement of the mobile terminal.

If the mobile terminal has an acceleration sensor, it is possible to detect a movement of the mobile terminal. In particular, it is thereby possible to detect a walking event of the user of the mobile terminal. Walking can be discerned e.g. using a classifier, such as a support vector machine (SVM), for example. A movement of the user using the mobile terminal can thus be compensated for using the generation of the information indicating a parking position.

Further, the vehicle can include at least one second image capture device for capturing second image data, wherein the second computation unit may be configured to take the second image data as a basis for determining a relative position of the mobile terminal in relation to the vehicle.

If the vehicle includes a second image capture device, then the vehicle can discern the mobile terminal in the image data generated therefrom using image processing, and can first of all determine the direction of the vehicle in relation to the mobile terminal. Taking into consideration that the mobile terminal is usually kept at a particular height, for example 1.5 m, in particular 1.3 m, by a driver, it is further possible to estimate the distance of the vehicle from the mobile terminal. This could be effected e.g. by way of triangulation, which involves known methods being used, such as e.g. a random sample consensus, RANSAC for short, algorithm being used, to discern the ground surface, and then a vertical height, situated orthogonally in relation to the ground surface, in relation to the mobile terminal being assumed. Alternatively, a position sensor can be determined to determine the ground surface.

In a further embodiment, the vehicle can move while the vehicle picks up the mobile terminal by use of the second image capture device.

Methods such as "simultaneous localization and mapping" (SLAM) can be used by the vehicle to determine and/or estimate the position of the mobile terminal during a movement by the vehicle. It is also additionally possible for vehicle information, such as e.g. the present speed or the steering lock, to be combined in order to further improve the determination of the position of the mobile terminal.

Moreover, the first computation unit, the second computation unit and/or a third computation unit of a server may be configured to take the information indicating a parking position as a basis for discerning a parking space of the vehicle.

A parking space may be characterized by a multiplicity of features. As such, it is possible e.g. for a parking space to be an area that lies between two vehicles that is in turn wide enough to accept a further vehicle. Further, a parking space may be displayed by a marking on the ground. A further possibility is for a parking space to be the area between two automobiles standing one behind the other, provided that said area has enough space for the applicable vehicle. Naturally, different further possibilities are also possible for features characterizing a parking space.

There are thus a large number of visual features that can be discerned in image data using methods of image recognition and image processing. One possible method for discerning the features in image data is e.g. scale-invariant feature transformation (SIFT). This method involves feature descriptions being used that, within certain limits, are invariant vis-à-vis scaling, rotation and translation and are therefore suitable for finding objects, such as e.g. parking spaces, in particular in the field of vehicle navigation.

One advantage is thus that not only a parking position but also a parking space itself is discerned. This may in particular be important in order to display to the driver the possible parking positions in an appealing manner. Further, a computation unit of a server can perform the computations during which the parking space is discerned. This has the advantage that the resources of the vehicle and/or of the mobile terminal are not unnecessarily stressed. Further, a server may have dedicated or specific hardware that can perform the computation in a particularly fast manner.

The mobile terminal may further be configured to take vehicle data and the information indicating a parking position as a basis for providing a simulation of the parking process.

It is thus possible to present how the vehicle would be after the parking process to the driver of the vehicle on a mobile terminal, such as e.g. a smartphone, even before the parking process. In this case, it is possible to use in particular vehicle data that can include e.g. the height, the width and/or the length of the vehicle. A simulation can therefore be performed using realistic data. Furthermore, it is possible to provide the results of the simulation to the driver of the vehicle. This provision can be effected in the form of a moving animation.

It is further possible for the information indicating a parking position to include the absolute position of the parking space.

The mobile terminal can include e.g. a GPS receiver, which the mobile terminal can use to determine its absolute position. Using these data, it is possible to determine the absolute position of the parking position. This has the advantage that the vehicle does not have to perform further computations to ascertain the absolute position of the parking space. If the vehicle itself includes a GPS receiver, that is to say can establish its absolute position, it is readily possible for the vehicle to get to the parking space autonomously. In such a case, it is possible for resources to be saved.

Moreover, the mobile terminal can include an inertial sensor for delivering inertial data, and the first computation unit may be configured to take the inertial data as a basis for determining the orientation and alignment of the mobile terminal.

If the mobile terminal has an inertial sensor for delivering inertial data, then the determination of the parking position, or of the parking space, can be improved. If the orientation and the alignment of the mobile terminal are known, then the distance from the mobile terminal to the parking space or parking position can be determined very accurately using image processing, as have already been described above.

The object is further achieved by a method for parking a vehicle, in particular using the systems described above, wherein the method comprises the following steps:

capturing first image data on a first image capture device of a mobile terminal;
discerning a parking position on the basis of the first image data;
transmitting information indicating a parking position to a vehicle;
determining a parking strategy on the basis of the information;
parking the vehicle at the parking position using the parking strategy.

In one embodiment, the information indicating the parking position can include a direction and a distance relative to the mobile terminal.

Further, the information indicating a parking space can include the absolute position of the parking space. In a further embodiment, the method can further comprise:
capturing second image data on at least one second image capture device of the vehicle;
determining the relative position of the mobile terminal on the basis of the second image data.

In one embodiment, the method can further include determining a relative position of the vehicle in relation to the mobile terminal and/or an alignment of the vehicle relative to the mobile terminal on the basis of the first image data, wherein the relative position and/or the relative alignment of the vehicle are partial information. The result is similar advantages to those indicated for the system described above.

The object is moreover achieved with a computer-readable storage medium that includes instructions that prompt a processor to implement the described method when the instructions are executed by the processor.

Other objects, advantages and novel features of the present invention will become apparent from the following detailed description of one or more preferred embodiments when considered in conjunction with the accompanying drawings.

BRIEF DESCRIPTION OF THE DRAWINGS

In the description that follows, the same reference numerals are used for parts that are the same and have the same effect.

DETAILED DESCRIPTION OF THE DRAWINGS

Figure 1:
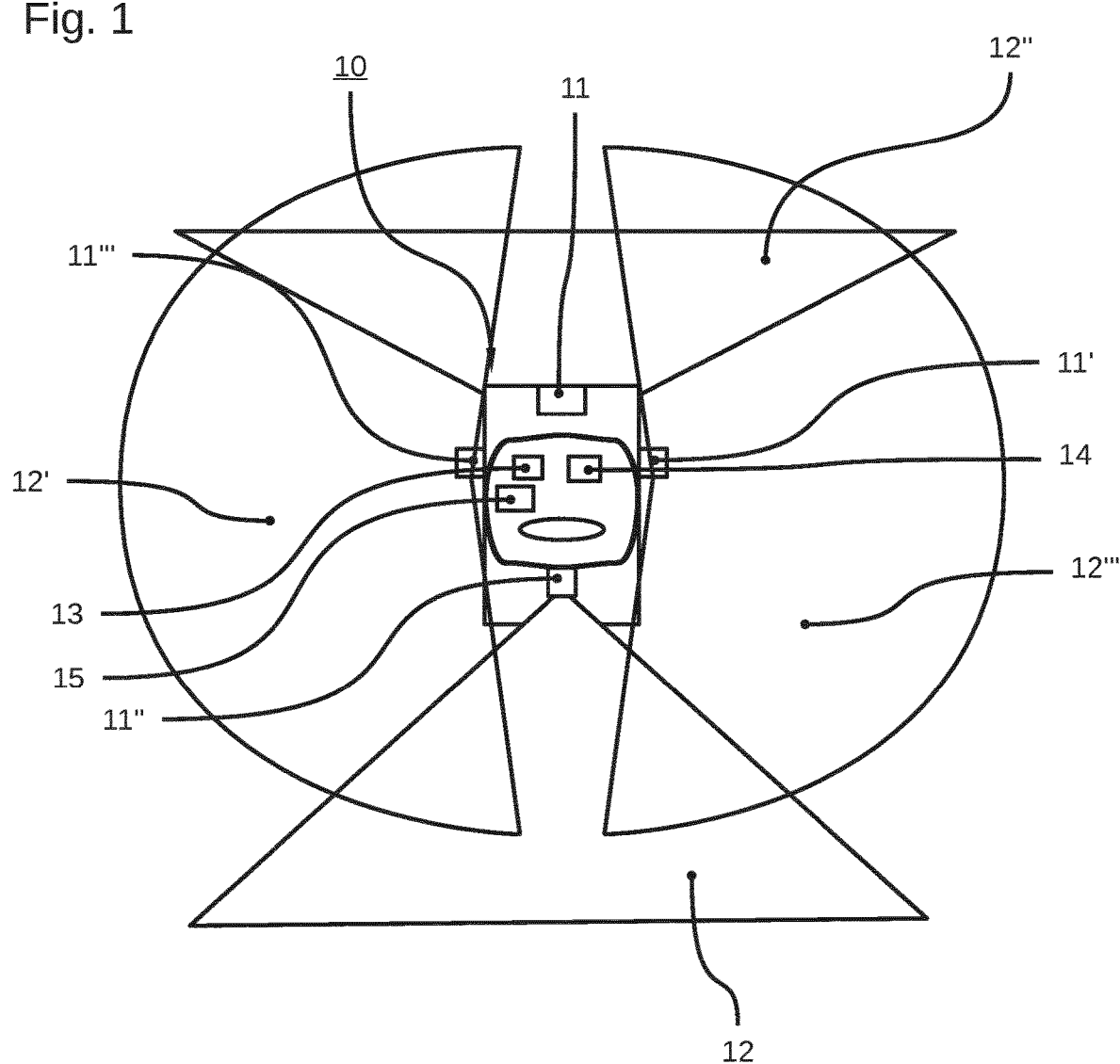
FIG. 1 shows a vehicle having a multiplicity of image capture devices.

FIG. 1 shows a vehicle 10 having four image capture devices 11, 11', 11'', 11''', a parking apparatus 13, a reception device 14 and a computation unit 15. In the first embodiment of the vehicle 10, the image capture devices 11, 11', 11'', 11''' are RGB cameras for capturing image areas 12, 12', 12'', 12'''. In further embodiments, the image capture devices 11, 11', 11'', 11''' may include radar units, LIDAR scanners, depth cameras, ultrasonic sensors or any other form of sensor system that is capable of detecting the surroundings of the vehicle. The parking apparatus 13 is configured to park the vehicle 10 in a discerned parking space autonomously. To this end, the parking apparatus 13 generates control signals that are sent to a control device (not shown) of the vehicle 10, so that the control device prompts the vehicle 10 to initiate applicable steering and acceleration or braking processes. The data of the image capture device 11, 11', 11'', 11''' of the vehicle 10 are forwarded to the computation unit 15 for processing. The computation unit 15 is, in the first embodiment, an onboard computer. The reception device 14 is configured to receive information 25 indicating a parking space wirelessly. This information 25 is provided by a mobile terminal 20.

Figure 2:
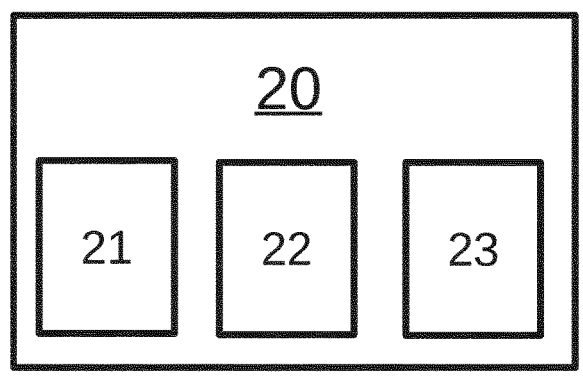
FIG. 2 shows a schematic depiction of a mobile terminal.

FIG. 2 shows a mobile terminal 20 of this kind in a highly simplified depiction. The mobile terminal 20 has an image capture device 21, a computation unit 22 and a transmission device 23. The image capture device 21 of the mobile terminal 20 is, in a first embodiment of the mobile terminal 20, an RGB camera. The mobile terminal 20 is a smartphone in the first embodiment. The captured image data 24 of the image capture device 21 of the mobile terminal 20 are forwarded for further processing to the computation unit 22 of the mobile terminal 20. After the processing, the information 25 is forwarded to the transmission device 23, which transmits the information 25 to the vehicle 10. This may firstly be a single transmission, on the other hand it is also possible for the transmission device to send data to the vehicle 10 continuously. Such continuous transmission of data has the advantage that the mobile terminal 20 itself needs to perform few computation operations. The computation unit 22 of the mobile terminal 20 may thus be of very low-spec design, which benefits the battery operating time of the mobile terminal 20. It is thus the case that the computation unit 22 of the mobile terminal 20 either processes the captured data of the image capture device 21 and/or forwards said data to the transmission device 23.

Figure 3:
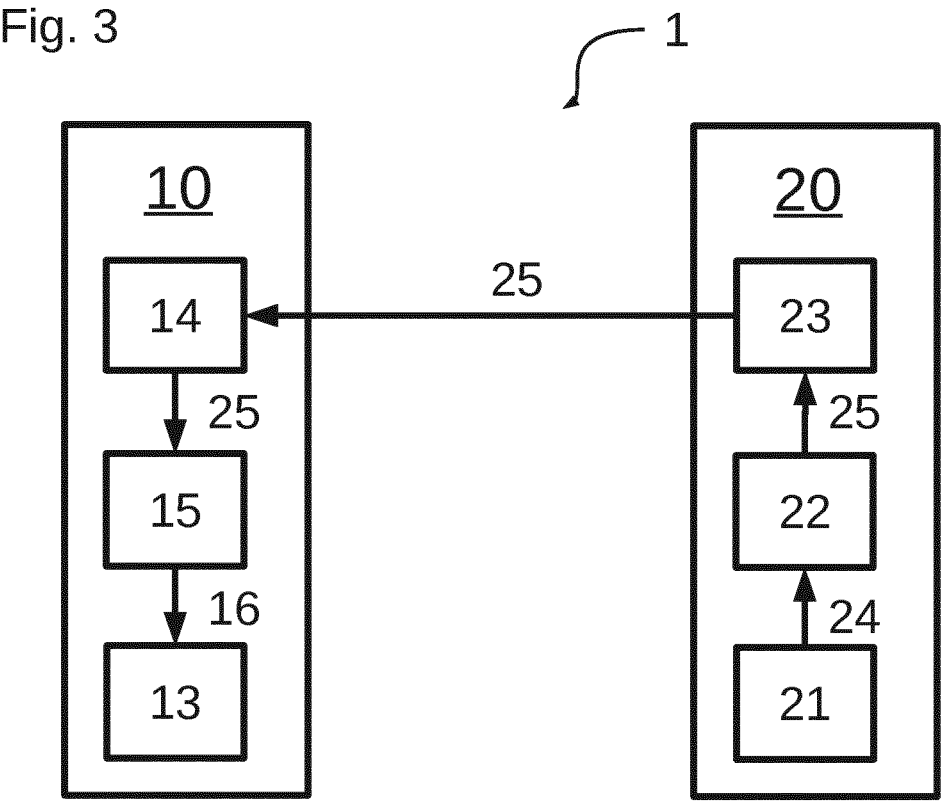
FIG. 3 shows a schematic depiction of the system in a first embodiment.

FIG. 3 shows the system 1 for parking a vehicle 10 in a first embodiment. In the first embodiment, an image capture device 21 of the mobile terminal 20 captures image data 24 that are sent to a computation unit 22 of the mobile terminal 20. From the image data 24, the computation unit 22 ascertains information 25 indicating a parking position. In the first embodiment, the computation unit 22 detects a parking space in the image data 24.

In the exemplary embodiment of FIG. 3, the computation unit 22 uses a Harris detector to detect features determining a parking space. In particular, the Harris detector can be used to determine the lines on a ground surface that has previously been extracted using the RANSAC algorithm. The arrangement of the features in the image allows a system trained in a training phase to identify a parking position 2 (see FIGS. 7 and 8).

In further embodiments, the parking position 2 can additionally be validated. This means that a check is carried out to determine whether the vehicle 10 has enough space in the parking position. To this end, it is in particular possible for metadata about the vehicle 10 to be used, such as the height, the width and the length of the vehicle 10, for example. Based on the result of the validation, the parking position 2 can be used further. If the validation is negative, then the method can be restarted with a further possible position.

The information 25 is now sent to a transmission device 23 of the mobile terminal 20 in order then to be sent from the transmission device 23 to the vehicle 10. In the first embodiment, this transmission is effected using a wireless network, e.g. based on the IEEE 802.11 standard. In other embodiments, e.g. Bluetooth, infrared or any other form of wireless transmission is also possible, however. Naturally, a wired transmission can also take place.

The vehicle 10 receives the information 25 by way of a reception device 14. The reception device 14 subsequently sends the information 25 to a computation unit 15 of the vehicle 10. The computation unit 15 processes the information 25 further. On the basis of the information 25, the computation unit 15 ascertains a parking strategy 16 for the vehicle 10.

Figure 6:
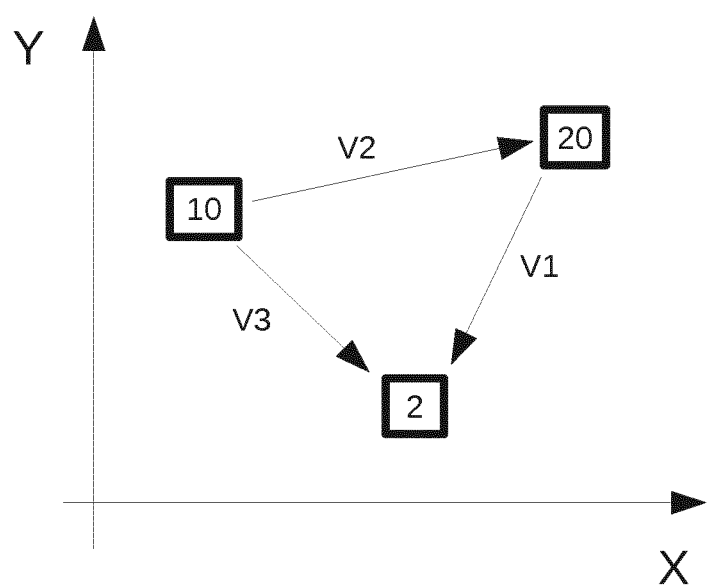
FIG. 6 shows the geometric relationship between the system components and a parking position.

The parking strategy 16 is, in the first embodiment, a vector V3 that points from the position of the vehicle 10 to the parking space 2 (see FIG. 6). In further embodiments, however, far more complex parking strategies are possible, such as e.g. a trajectory that has been ascertained by a movement planner. To ascertain the trajectory, a multiplicity of known algorithms can be considered, such as e.g. RRT ("Rapidly Exploring Random Tree").

The parking strategy 16 is subsequently transmitted to the parking apparatus 13. The parking apparatus 13 can then prompt the vehicle 10 to park in the parking space 2.

Figure 4:
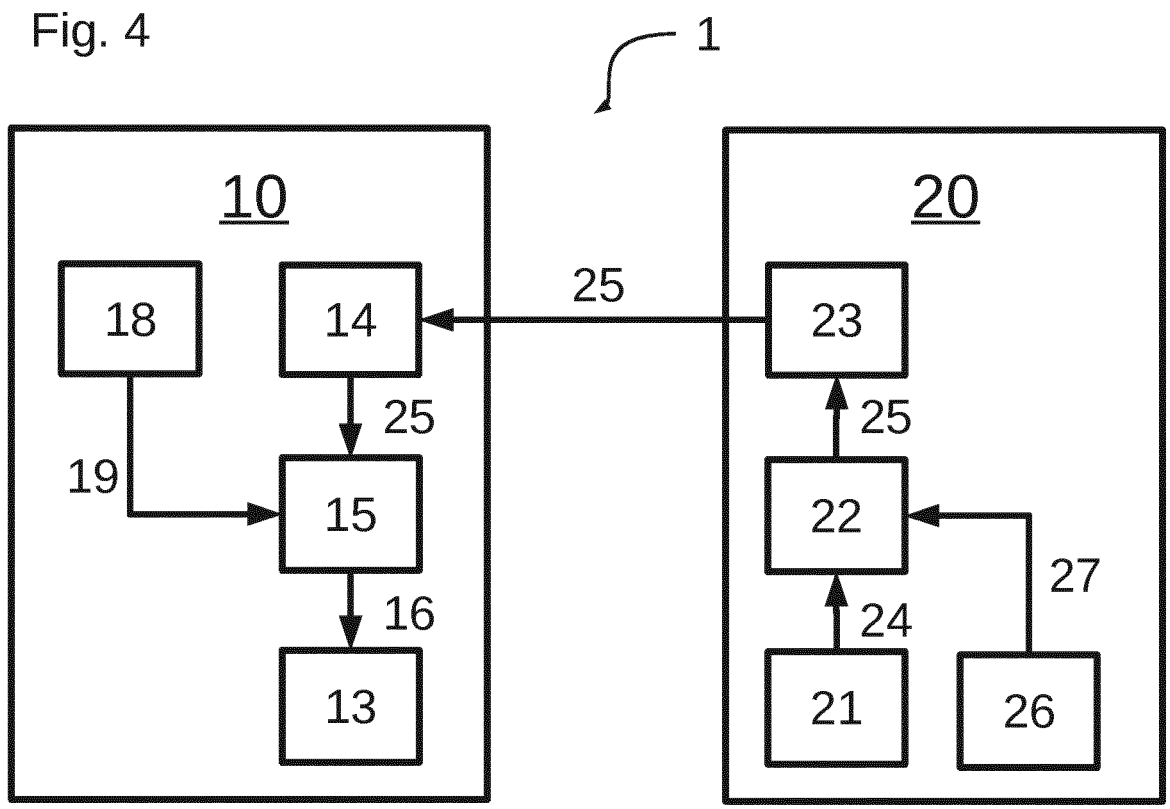
FIG. 4 shows a schematic depiction of the system in a second embodiment.

FIG. 4 shows the system 1 in a second embodiment. In the second embodiment, the mobile terminal further includes an inertial sensor 26. The inertial sensor 26 is configured to deliver inertial data 27 to the computation unit 22 of the mobile terminal 20. The inertial data 27 comprise data that indicate the orientation and alignment of the mobile terminal 20. Together with the image data 24 of the image capture device 21 of the mobile terminal 20, the computation unit 22 can provide information 25 indicating a parking position 2, this information 25 comprising a relative distance and direction of the parking position 2 from the mobile terminal 20. The information 25 is then sent from the transmission device 23 of the mobile terminal 20 to the reception device 14 of the vehicle 10. The vehicle 10 includes, in a second embodiment, an image capture device 18 that sends image data 19 to the computation unit 15 of the vehicle 10. The computation unit 15 is therefore provided with the image data 19 and also the information 25 indicating a parking position 2. The computation unit 15 is configured to discern the mobile terminal 20 in the image data 19. It is therefore possible for the vehicle 10 to ascertain the position of the mobile terminal 20 relative to the vehicle 10. Using the information 25 indicating a position 2 at which the vehicle 10 is parked, it is possible for the computation unit 15 to determine the absolute position of the parking position 2. Such determination can be effected using simple means, such as triangulation. On the basis of the ascertained relative position of the parking position 2 of the vehicle 10, the computation unit 15 can compute a parking strategy 16. In the second embodiment, the parking strategy 16 indicates how the vehicle 10 is supposed to park in the parking position 2. This comprises a trajectory along which the vehicle 10 is supposed to travel. The parking apparatus 13, which is provided with the parking strategy 16 by the computation unit 15, prompts the vehicle 10 to follow the trajectory indicated in the parking strategy 16.

Figure 5:
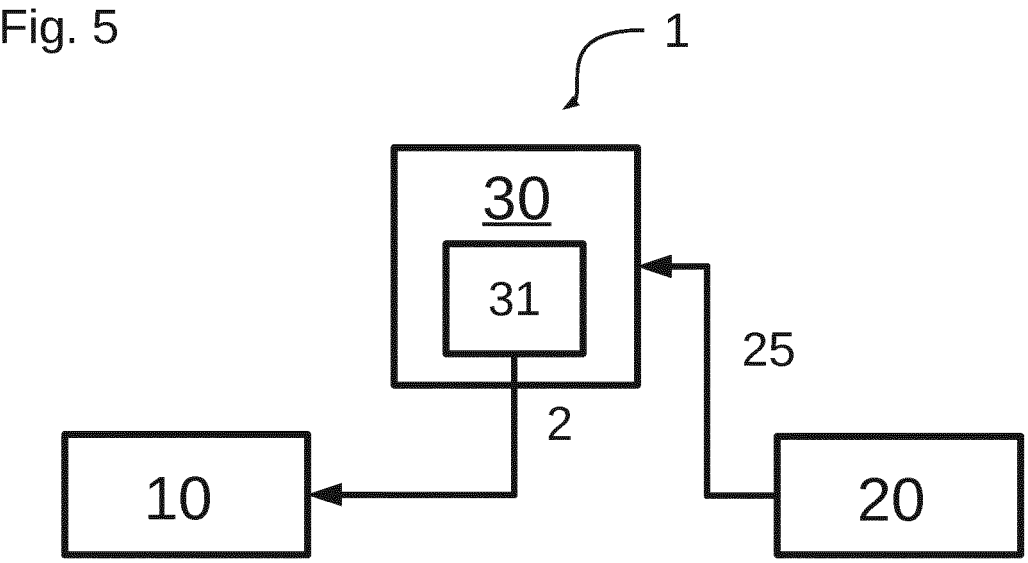
FIG. 5 shows a schematic depiction of the system in a third embodiment.

FIG. 5 shows the system 1 in a third embodiment. In the third embodiment, the mobile terminal 20 sends information 25 to a server 30. In this case, the information 25 is sent to the server 30 as a continuous data stream. In the third embodiment, the information 25 merely includes captured image data 24 of the mobile terminal 20. The server 30 includes a third computation unit 31 that is configured to ascertain a parking position 2 from the information 25. The server 30 is, in the third embodiment, a web server that can be reached via the Internet. The transmission of the information 25 can therefore be effected from the mobile terminal 20 using a radio standard, such as e.g. LTE or UMTS. The computation unit 31 of the server 30 delivers the parking position 2 to the vehicle 10. The vehicle 10 can therefore, as in the previous embodiments, compute a parking strategy 16.

FIG. 6 shows the geometric relationship of the vehicle 10, the mobile terminal 20 and the parking position 2 in a simplified, two-dimensional depiction. It can therefore be seen that if the mobile terminal 20 has discerned the parking position 2, a vector V1 can be computed that indicates the relative position of the parking position 2 in relation to the mobile terminal 20. If the vehicle 10 is configured to locate the mobile terminal 20 in a captured image area 12, 12', 12'', 12''', the vehicle 10 can determine a vector V2 that indicates the relative position of the mobile terminal 20 in relation to the vehicle 10. Using vector addition, it is therefore possible for a vector V3 to be determined that indicates the parking position 2 relative to the position of the vehicle 10. Using the vector V3, the vehicle 10 can ascertain the parking strategy 16 described previously. Naturally, it is possible for the relative positions to be provided in three-dimensional space. This means that it is also possible to discern those cases in which different parking positions are not in one plane.

Figure 7:
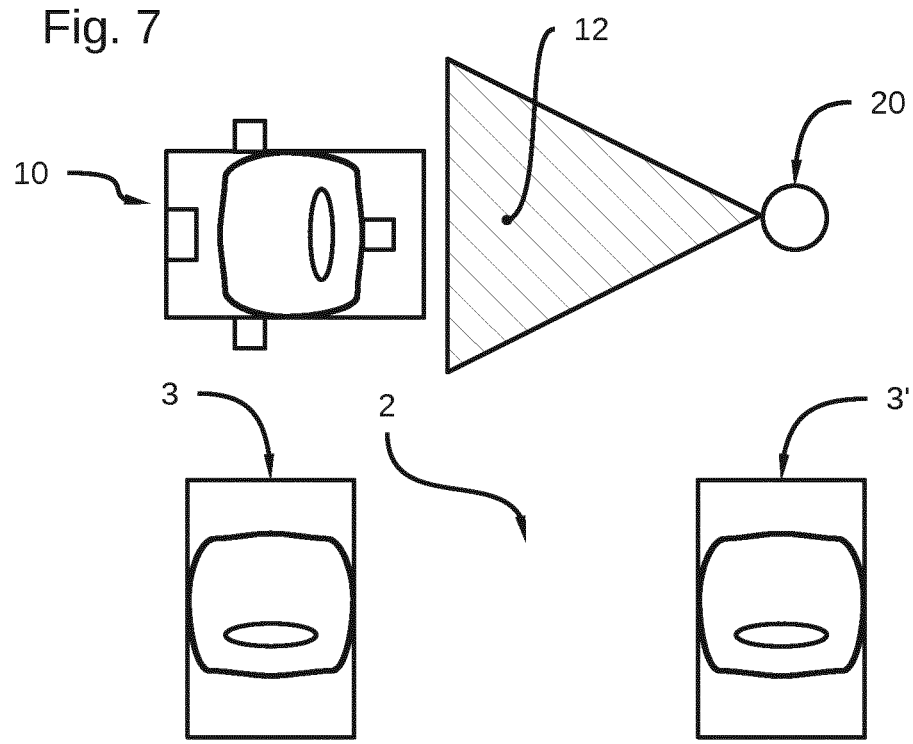
FIG. 7 shows an exemplary parking situation in a first state.
Figure 8:
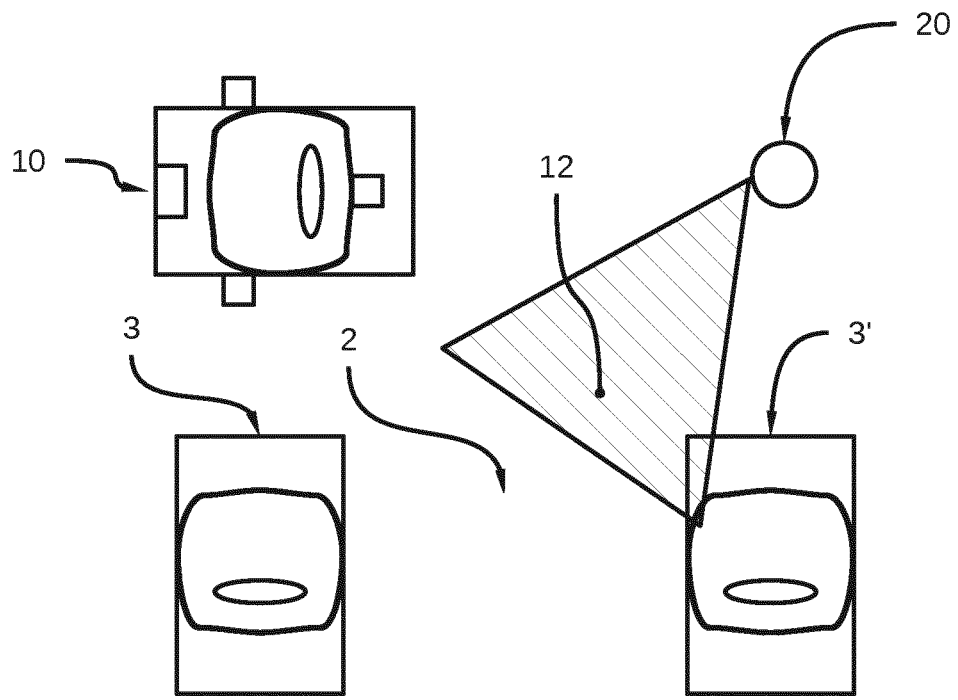
FIG. 8 shows an exemplary parking situation in a second state.

FIGS. 7 and 8 show an exemplary scenario in which a driver of a vehicle 10 initiates a parking process for the vehicle 10. FIG. 7 shows a mobile terminal 20 that is outside a vehicle 10. Two parked vehicles 3, 3' bound a parking space 2 in which the vehicle 10 can park. The driver first of all points the mobile terminal 20 at the vehicle 10, so that said vehicle is in a captured image area 12 of the mobile terminal 20. The mobile terminal 20 can then determine its position relative to the vehicle 10. Alternatively, the mobile terminal 20 may also be configured to receive a relative alignment and/or relative position of the vehicle 10 in relation to the mobile terminal 20.

As time progresses, the driver can use a swivel movement to point the mobile terminal at the parking position 2. This is shown in FIG. 8.

The mobile terminal 20 picks up the parked automobiles 3, 3' defining a parking position 2 and can therefore ascertain that this is a possible parking space for the vehicle 10. Further, the mobile terminal 20 can use the estimated height of the mobile terminal, as explained further above, to determine the distance and direction of the parking position 2. This information is subsequently sent by the mobile terminal 20 to the vehicle 10, as already described in connection with the other figures.

Figure 9:
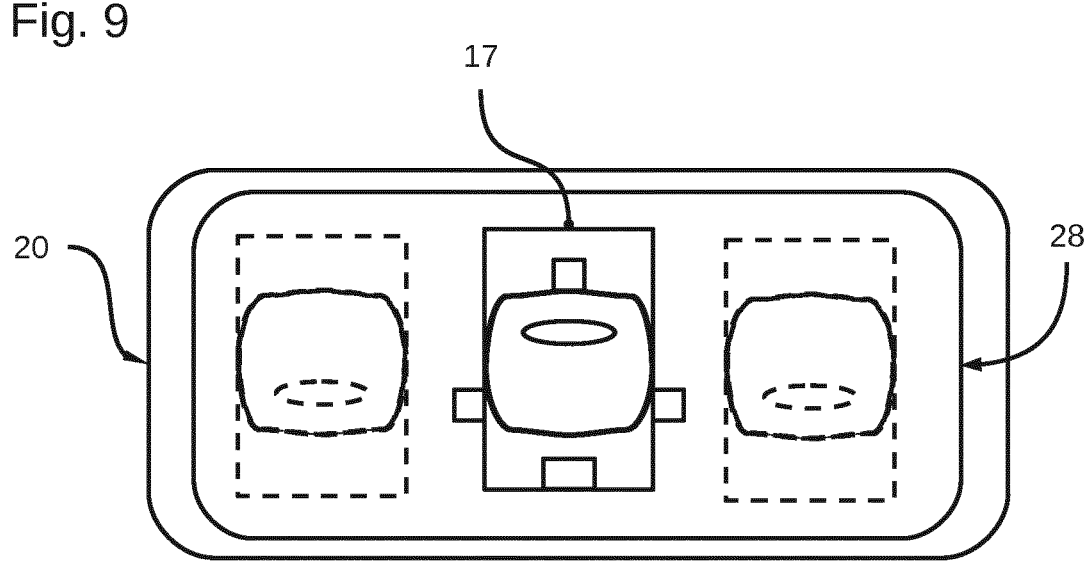
FIG. 9 shows a first depiction of a parking process on a mobile terminal.
Figure 10:
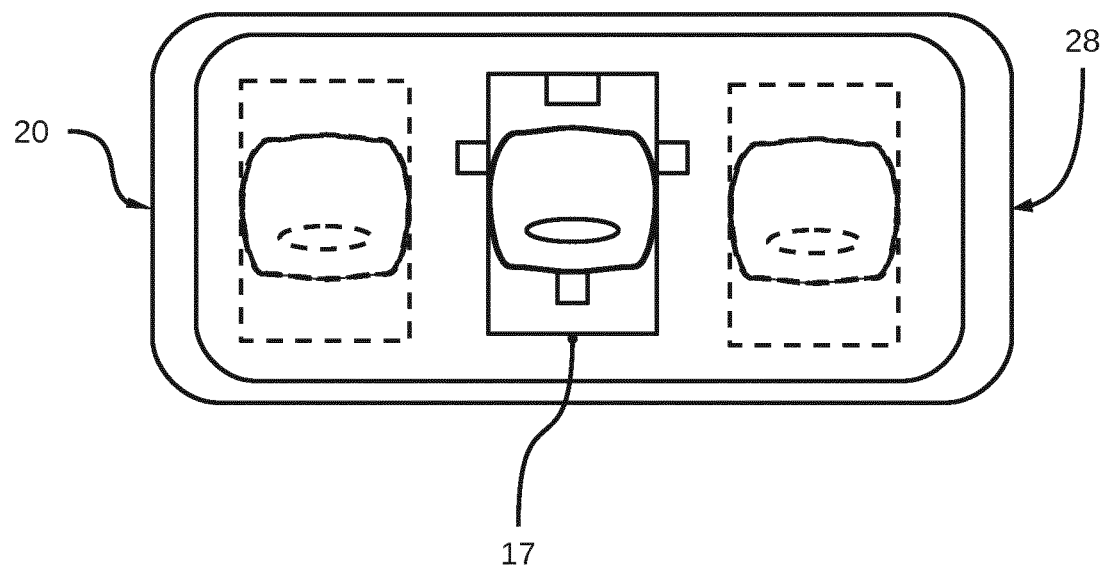
FIG. 10 shows a second depiction of a parking process on a mobile terminal.

Before the actual parking process for the vehicle 10, the mobile terminal 20 can provide the driver of the vehicle 10 with a simulation of the planned parking process. FIG. 9 shows a mobile terminal 20 that has a display 28. In the simulation shown in FIG. 9, the vehicle 10 is parked such that the front 17 of the vehicle 10, in the depiction of FIG. 9, points upward. By contrast, FIG. 10 shows a simulation in which the front 17 of the vehicle 10 points downward. The driver of the vehicle 10 is able, by means of an input on the mobile terminal 20, to determine the manner in which the vehicle 10 is supposed to travel into the parking position 2. To this end, the driver can make gestures on a touchscreen that symbolize a rotary movement. This is in particular advantageous if the driver wishes to have the trunk accessible, for example in order to pack shopping.

In further embodiments, the simulation can be presented to the driver on a display and/or a smartglass by augmented reality. In this case, the simulation is overlaid on recorded images from the image capture device 21 of the mobile terminal 20. Therefore, the driver is provided with a very simple depiction of the complex parking situation. The parking situation can include the parking position 2 and/or the surrounding objects of the vehicle 10 or of a parking space and/or the vehicle geometry and/or geometry of vehicle components. The simulation can therefore also include a simulation of further vehicle components, such as the maximum opened position of doors and the trunk, for example. The driver can therefore discern whether sufficient space to open the doors is left and can take this into consideration directly when assessing the parking position 2.

Optionally, the simulation provided allows a check by the driver to take place. If the driver establishes that the parking position 2 has been chosen unfavorably or even discerned incorrectly, he has the option of correcting it. In particular, the driver can perform a correction by selecting a further parking position 2. In a further embodiment, the selection of a further parking position 2 can be made automatically by the vehicle 10, by the mobile terminal 20 and/or by an external server 30.

Additionally, the inputs of the driver can be transmitted to the vehicle 10. The vehicle 10 can subsequently take into consideration the transmitted inputs when ascertaining the parking strategy 16.

In the embodiments described, it is possible for the mobile terminal to be either a smartphone, a smartwatch that has an image capture device or a smartglass. In particular, a smartglass has the advantage that the driver can scan the parking position 2 and prompt the vehicle 10 to park in the parking position 2 by merely looking at said parking position. Therefore, operation of the vehicle 10 is very simple.

LIST OF REFERENCE SYMBOLS

1 System
2 Parking position
3, 3' Parked vehicle
10 Vehicle
11, 11', 11", 11'" Second image capture device
12, 12', 12", 12'" Captured image area
13 Parking apparatus
14 Reception device
15 Second computation unit
16 Parking strategy
17 Front
18 Second image capture device
19 Second image data
20 Mobile terminal
21 First image capture device
22 First computation unit
23 Transmission device
24 First image data
25 Information
26 Inertial sensor
27 Inertial data
28 Display
30 Server
31 Third computation unit
V1, V2, V3 Vector The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A system for parking a vehicle, comprising:
a mobile terminal comprising
(i) at least one first camera for capturing first image data, and
(ii) an inertial sensor for delivering inertial data,
the mobile terminal being configured to:
(i) receive the first image data from the first camera;
(ii) take the first image data as a basis for generating information indicating a parking position;
(iii) transmit the information; and
(iv) take the inertial data as a basis for determining an orientation and alignment of the mobile terminal;
the vehicle comprising a second camera for capturing second image data,
the vehicle being configured to:
(i) receive the information;
(ii) take the information as well as the inertial data or the orientation and alignment determined based thereon as a basis for determining a parking strategy;
(iii) take into consideration the parking strategy to park the vehicle at the parking position;
(iv) take a second image data from the second camera;
(v) take the second image data as a basis for determining a relative position of the mobile terminal in relation to the vehicle, and
(vi) take the relative position of the mobile terminal in relation to the vehicle as a further basis for determining a parking strategy.

2. The system as claimed in claim 1, wherein the information comprises a direction and a distance of the parking position relative to the mobile terminal.

3. The system as claimed in claim 1, wherein the mobile terminal is configured to determine a relative position and/or alignment of the vehicle in relation to the mobile terminal on the basis of the first image data.

4. The system as claimed in claim 1, wherein the mobile terminal, the vehicle and/or a computation unit of a server is configured to take the information as a basis for discerning a parking space for the vehicle.

5. The system as claimed in claim 1, wherein the mobile terminal is configured to take vehicle data and the information as a basis for providing a simulation of the parking process.

6. The system as claimed in claim 1, wherein the information comprises an absolute position of the parking space.

7. A method for parking a vehicle, the method comprising the steps of:
capturing first image data on a camera of a mobile terminal;
discerning a parking position on the basis of the first image data;
transmitting information indicating a parking position to a vehicle;
collecting inertial data of the mobile terminal;
determining an orientation and alignment of the mobile terminal based on inertial data;
capturing second image data on at least one second camera of the vehicle;
determining the relative position of the vehicle in relation to the mobile terminal based on the second image data and the orientation and alignment of the mobile terminal;
determining a parking strategy on the basis of the information transmitted by the mobile terminal and the relative position of the vehicle in relation to the mobile terminal; and
parking the vehicle at the parking position using the parking strategy.

8. The method as claimed in claim 7, wherein
the information comprises a direction and a distance relative to the mobile terminal.

9. The method as claimed in claim 8, wherein
the information comprises an absolute position of the parking space.

10. The method as claimed in claim 7, wherein
the information comprises an absolute position of the parking space.

11. The method as claimed in claim 7, the method further comprising the step of:
determining a relative position of the vehicle in relation to the mobile terminal and/or an alignment of the vehicle relative to the mobile terminal on the basis of the first image data, wherein the relative position and/or the relative alignment of the vehicle are information.

12. A method for parking a vehicle configured to consider a parking strategy to park the vehicle in a parking position, the method comprising the steps of:
receiving information indicating a parking position, said information being generated from first image data of a first camera of a mobile terminal and inertial data indicating the orientation and alignment of the mobile terminal,
taking second image data captured on at least one second camera of the vehicle;
determining, in the vehicle, a parking strategy based on the received information and the second image data; and
parking the vehicle at the parking position using the determined parking strategy.

13. The method as claimed in claim 12, wherein
the information comprises a direction and a distance relative to the mobile terminal.

14. The method as claimed in claim 13, wherein
the information comprises an absolute position of the parking position.

15. A computer program product comprising a non-transitory computer-readable medium having stored thereon program code that, when executed by a processor, carry out a method to:
capture first image data on a first camera of a mobile terminal;
discern a parking position on the basis of the first image data;
transmit information indicating a parking position to a vehicle;
capture second image data on at least one second camera of the vehicle;
determine orientation and alignment of the mobile terminal based on inertial data collected from an inertial sensor of the mobile terminal;
determine a parking strategy on the basis of the transmitted information as well as the inertial data or the orientation and alignment determined based thereon; and
park the vehicle at the parking position using the parking strategy.

\* \* \* \* \*